(12) United States Patent
Greif et al.

(10) Patent No.: US 12,319,458 B2
(45) Date of Patent: Jun. 3, 2025

(54) SEALING DEVICE AND LONGITUDINAL SEALING DEVICE COMPRISING SUCH A SEALING DEVICE

(71) Applicant: Syntegon Technology GmbH, Waiblingen (DE)

(72) Inventors: Tobias Greif, Backnang (DE); Rüdiger Karcher, Lorch (DE); Bernd Konrad Bischoff, Waiblingen (DE)

(73) Assignee: Syntegon Technology GmbH, Waiblingen (DE)

( * ) Notice: Subject to any disclaimer, the term of this patent is extended or adjusted under 35 U.S.C. 154(b) by 0 days.

(21) Appl. No.: 18/687,160

(22) PCT Filed: Sep. 26, 2022

(86) PCT No.: PCT/EP2022/076700
§ 371 (c)(1),
(2) Date: Feb. 27, 2024

(87) PCT Pub. No.: WO2023/052301
PCT Pub. Date: Apr. 6, 2023

(65) Prior Publication Data
US 2024/0425217 A1 Dec. 26, 2024

(30) Foreign Application Priority Data
Sep. 28, 2021 (DE) ...................... 10 2021 125 155.9

(51) Int. Cl.
*B65B 51/30* (2006.01)
*B65B 41/12* (2006.01)
(52) U.S. Cl.
CPC .............. *B65B 51/30* (2013.01); *B65B 41/12* (2013.01)

(58) Field of Classification Search
CPC ............. B29C 66/1122; B29C 66/4312; B29C 66/849; B29C 66/4322; B29C 66/83221;
(Continued)

(56) References Cited

U.S. PATENT DOCUMENTS 3,027,695 A * 4/1962 Leasure ................ B65B 51/303
53/552
3,596,315 A * 8/1971 Yoshikawa ....... B29C 49/42073
425/174
(Continued)

FOREIGN PATENT DOCUMENTS

EP 1167192 A2 1/2002
EP 1560752 B1 7/2006

OTHER PUBLICATIONS

German Patent Office Action for Application No. DE 102021125155.9 dated May 27, 2022 (5 pages including English translation).
(Continued)

*Primary Examiner* — Dariush Seif
(74) *Attorney, Agent, or Firm* — Michael Best & Friedrich LLP

(57) ABSTRACT

A sealing device includes a sealing holder for fixing a sealing jaw of the sealing device, and a further sealing holder for fixing a further sealing jaw. The sealing holder and the further sealing holder are arranged on a mechanical coupling unit and are supported movably relative to each other. The coupling unit includes a force transmission element and a further force transmission element, the force transmission element being configured to transmit a sealing force to the sealing holder in the form of a pressure force. The further force transmission element is configured to transmit the provided sealing force to the further sealing holder in the form of a traction force. The coupling unit comprises a piston unit with a piston chamber and a piston. The piston is connected with one of the force transmission
(Continued)

elements and the piston chamber is connected with another one of the force transmission elements.

12 Claims, 3 Drawing Sheets

(58) Field of Classification Search
 CPC ............ B29C 66/8225; B29C 66/8221; B29C 66/8242; B29C 66/8322; B29C 65/18; B65B 51/30; B65B 51/303; B65B 9/20; B65B 9/213
 See application file for complete search history.

(56) References Cited

U.S. PATENT DOCUMENTS

| | | | | |
|---|---|---|---|---|
| 3,685,250 | A * | 8/1972 | Henry | B29C 66/8242 53/374.6 |
| 3,830,681 | A * | 8/1974 | Wilson | B29C 66/73921 53/425 |
| 3,986,921 | A * | 10/1976 | Putnam, Jr. | B29C 66/849 156/583.1 |
| 4,241,560 | A * | 12/1980 | Deimel | B29C 65/787 53/DIG. 2 |
| 4,291,520 | A * | 9/1981 | Prince | B29C 66/4312 53/374.6 |
| 4,391,081 | A * | 7/1983 | Kovacs | B29C 66/49 53/436 |
| 4,537,012 | A * | 8/1985 | Groom | B29C 66/849 53/374.8 |
| 4,546,596 | A * | 10/1985 | Cherney | B29C 66/49 53/551 |
| 4,676,051 | A | 6/1987 | Hoskinson et al. | |
| 4,757,668 | A * | 7/1988 | Klinkel | B65B 51/32 53/374.6 |
| 4,768,327 | A * | 9/1988 | Mosher | B29C 66/4312 53/551 |
| 4,947,621 | A * | 8/1990 | Christine | B29C 66/8242 493/193 |
| 4,956,912 | A * | 9/1990 | Preg | B29C 66/1122 29/730 |
| 4,965,986 | A * | 10/1990 | Klinkel | B65B 9/213 53/389.5 |
| 5,014,499 | A * | 5/1991 | Boeckmann | B65B 9/20 53/551 |
| 5,329,745 | A * | 7/1994 | Suga | B65B 9/067 53/550 |
| 5,417,041 | A * | 5/1995 | Hansen | B65B 53/063 53/550 |
| 5,505,037 | A * | 4/1996 | Terminella | B65B 61/188 53/139.2 |
| 5,540,035 | A * | 7/1996 | Plahm | B29C 66/83421 53/550 |
| 5,746,043 | A * | 5/1998 | Terminella | B29C 66/8222 53/551 |
| 5,771,667 | A * | 6/1998 | McGregor | B65B 43/465 53/481 |
| 5,930,983 | A * | 8/1999 | Terminella | B65B 61/188 53/436 |
| 6,052,971 | A * | 4/2000 | Malsam | B65B 51/303 53/526 |
| 9,938,032 | B2 * | 4/2018 | Matheny | B29C 66/83221 |
| 10,689,137 | B2 * | 6/2020 | Wolf | B65B 9/087 |
| 10,781,004 | B2 * | 9/2020 | Yasuda | B29C 66/4312 |
| 12,262,888 | B2 * | 4/2025 | Harris | A61B 17/072 |
| 2003/0074865 | A1 * | 4/2003 | Nakagawa | B65B 9/2028 53/551 |
| 2003/0093971 | A1 * | 5/2003 | Terminella | B29C 66/849 53/133.4 |
| 2004/0020166 | A1 * | 2/2004 | Cortigiano, Sr. | B29C 66/3452 53/139.2 |
| 2005/0109444 | A1 * | 5/2005 | Kochan | B29C 66/4322 53/370.7 |
| 2008/0276576 | A1 * | 11/2008 | Anderson | B29C 66/43122 53/565 |
| 2011/0107729 | A1 * | 5/2011 | Miyazaki | B29C 66/81431 53/562 |
| 2011/0192117 | A1 * | 8/2011 | Lubezny | B29C 66/8225 53/370.7 |
| 2012/0285127 | A1 * | 11/2012 | Kamigaito | B29C 66/49 53/545 |
| 2014/0187399 | A1 * | 7/2014 | Hsu | B65B 51/146 493/186 |
| 2015/0121813 | A1 * | 5/2015 | Bierschenk | B65B 51/303 53/551 |
| 2018/0057198 | A1 * | 3/2018 | Anderson | B29C 65/18 |
| 2018/0170599 | A1 * | 6/2018 | Bierschenk | B29C 66/4312 |
| 2019/0152638 | A1 * | 5/2019 | Nakamura | B65B 59/04 |
| 2021/0370613 | A1 * | 12/2021 | Klinstein | B29C 66/73921 |
| 2024/0076087 | A1 * | 3/2024 | Lagarde | B29C 66/8223 |
| 2024/0425217 | A1 * | 12/2024 | Greif | B29C 65/18 |

OTHER PUBLICATIONS

Translation of International Search Report for Application No. PCT/EP2022/076700 dated Feb. 17, 2023 (2 pages).

* cited by examiner

A-A

SEALING DEVICE AND LONGITUDINAL SEALING DEVICE COMPRISING SUCH A SEALING DEVICE

BACKGROUND

From EP 1 167 192 A2 and DE 603 07 129 T2 sealing devices for a longitudinal sealing apparatus of a packaging machine are already known, wherein the known sealing devices comprise at least one sealing holder for a fixing of a sealing jaw of the longitudinal sealing apparatus, at least one further sealing holder for a fixing of a further sealing jaw of the longitudinal sealing apparatus, the sealing holder and the further sealing holder being supported movably relative to each other, and comprise a mechanical coupling unit which the sealing holder and the further sealing holder are arranged on, wherein the coupling unit comprises at least one force transmission element and a further force transmission element, the force transmission element being configured, during a sealing, to transmit a provided sealing force to the sealing holder in the form of a pressure force, and the further force transmission element being configured, during a sealing, to transmit the provided sealing force to the further sealing holder in the form of a traction force.

SUMMARY

The invention is based on a sealing device for a longitudinal sealing apparatus of a packaging machine, with at least one sealing holder for a fixing of a sealing jaw of the longitudinal sealing apparatus, with at least one further sealing holder for a fixing of a further sealing jaw of the longitudinal sealing apparatus, the sealing holder and the further sealing holder being supported movably relative to each other, and with a mechanical coupling unit which the sealing holder and the further sealing holder are arranged on, wherein the coupling unit comprises at least one force transmission element and a further force transmission element, the force transmission element being configured, during a sealing, to transmit a provided sealing force to the sealing holder in the form of a pressure force, and the further force transmission element being configured, during a sealing, to transmit the provided sealing force to the further sealing holder in the form of a traction force.

It is proposed that the coupling unit comprises at least one, in particular pneumatic, piston unit with at least one piston chamber and with a piston supported in the piston chamber, wherein the piston is operatively connected with one of the force transmission elements and the piston chamber is operatively connected with another one of the force transmission elements than the piston. During the sealing, in particular a packaging material is sealed by pressing at least one of the sealing jaws to the packaging material by the sealing force. The sealing jaw is, at least during the sealing, in particular rigidly, connected to the sealing holder, in particular fixed thereto. Preferably the further sealing jaw is, at least during the sealing, rigidly connected to the further sealing holder, in particular fixed thereto. In particular, during the sealing the sealing jaw is pressed by means of the coupling unit, by the pressure force, against the packaging material with the sealing holder acting as an intermediary. In particular, during the sealing the further sealing jaw is pulled by means of the coupling unit, by the traction force, against the packaging material, with the further sealing holder acting as an intermediary. Preferentially the sealing jaw is configured for generating a longitudinal seam at the packaging material. Preferentially the further sealing jaw is configured for generating a further longitudinal seam at the packaging material. The longitudinal seam and the further longitudinal seam may be realized as an edge seam, which in particular forms an edge of the packaging from two neighboring regions of the packaging material, or as a closed seam, which in particular connects two ends of the packaging material which face away from each other or two sheets of the packaging material. The longitudinal seam and the further longitudinal seam are preferably produced spaced apart from each other. In particular, the sealing jaw and the further sealing jaw are arranged spaced apart from each other during the sealing. Alternatively, the sealing jaw and the further sealing jaw are pressed against each other during the sealing in order to create a single longitudinal seam. The sealing jaw and the further sealing jaw are preferably realized so as to be electrically heatable for generating the longitudinal seams. Alternatively, the sealing jaw and the further sealing jaw are formed for generating the longitudinal seams by ultrasound welding. The sealing jaws are preferably screwed or otherwise fixed at the sealing holders. In particular, the sealing jaws are exchangeable, for example depending on the longitudinal seam that is to be created and/or on the type of packaging material.

The packaging material is preferably realized in the form of a film and may in particular have a one-layer structure or a multilayer structure. The packaging material and/or at least one layer of the packaging material may be made of paper, of a synthetic material, in particular polypropylene, polyester and/or polyethylene, of a textile and/or of a metal. In particular, the packaging material is a composite material. The packaging machine is in particular configured for forming a container, in particular a tubular pouch and/or a stand-up pouch, from the packaging material, for filling the container with a packaging product and for closing the container. Preferably the packaging machine comprises at least one filling tube or filling chute for a filling of the containers formed from the packaging material. The filling tube or filling chute preferably has a longitudinal filling axis which is configured, for an operation of the packaging machine, to be aligned with the vertical and along which a product for packaging is transported in the formed container when the packaging machine is in operation. The packaging machine in particular comprises a packaging material guidance, which is configured to form the packaging material, preferably a single sheet of the packaging material, around the filling tube or the filling chute in a hose shape. The longitudinal sealing apparatus is in particular configured to fix by the sealing a shape of the packaging material that encompasses the filling chute. In particular, the longitudinal sealing apparatus is configured to create the longitudinal seams at least substantially parallel to the longitudinal filling axis. "Substantially parallel" is here in particular mean an orientation of a direction relative to a reference direction, in particular in a plane, wherein a deviation of the direction from the reference direction is in particular smaller than 8°, advantageously smaller than 5° and especially advantageously smaller than 2°.

The sealing device in particular comprises a machine frame, which is in particular configured, during an operation of the longitudinal sealing apparatus, to be immobile relative to the filling tube or filling chute. The coupling unit is preferably supported on the machine frame so as to be movable relative to the machine frame. The coupling unit is in particular configured to press the sealing jaws against the packaging material during the sealing, and in particular to move the sealing jaws away from the packaging material after the sealing. The longitudinal sealing apparatus in particular comprises at least one drive element for moving the coupling unit relative to the machine frame. Preferentially the drive element is a pneumatic drive element, alternatively a hydraulic drive element or an electrical drive element. The coupling unit is in particular configured to distribute the provided sealing force by the drive element, preferably evenly, between the sealing holder and the further sealing holder. In particular, the sealing holder and the further sealing holder are connected to the same drive element via the coupling unit. The longitudinal sealing apparatus optionally comprises several drive elements together providing the sealing force, wherein the sealing holder and the further sealing holder are connected to all cooperating drive elements via the coupling unit. In particular, the sealing holder is movable, in particular at least over a full movement range of the sealing holder, relative to the machine frame only together with the further sealing holder. Preferably the further sealing holder is movable relative to the machine frame, in particular at least over a full movement range of the further sealing holder, only together with the sealing holder. In particular, when subjected to the sealing force, the sealing holder and the further sealing holder carry out a coupled movement, in particular at least over a full movement range of the further sealing holder.

The force transmission element and/or the further force transmission element are preferably embodied as rods, alternatively as steel cables, to which the sealing holder and/or the further sealing holder are/is fixed. The force transmission element is in particular configured for a displacement of the sealing holder along a displacement direction. Preferably the further force transmission element is configured for a displacement of the further sealing holder along a further displacement direction. The displacement direction and the further displacement direction in particular run at least substantially parallel to the same straight line. Due to a transmission of the sealing force as a pressure force and as a traction force, the displacement direction and the further displacement direction are particularly preferably oriented opposed to each other. In particular, for the sealing the sealing holder and the further sealing holder are moved towards each other along a straight line, and are in particular moved away from each other along this straight line after the sealing. The longitudinal sealing apparatus in particular has a transport direction, along which the packaging material is conveyed through the longitudinal sealing apparatus by a packaging transport unit of the longitudinal sealing apparatus and/or of the packaging machine. The displacement direction and the further displacement direction are preferably at least substantially perpendicular to the transport direction. The transport direction is in particular oriented at least substantially parallel to, in particular concentrically with, the longitudinal filling axis. In particular, the sealing device encompasses the filling tube or filling chute in a plane perpendicular to the transport direction. Preferably the packaging transport unit is configured to transport the packaging material through the longitudinal sealing apparatus between the filling tube or filling chute and the sealing device. The term "substantially perpendicular" is here in particular meant to define an orientation of a direction relative to a reference direction, wherein the direction and the reference direction, in particular viewed in a projection plane, include an angle of 90°, the angle having a maximal deviation of in particular less than 8°, advantageously less than 5° and especially advantageously less than 2°.

By the implementation of the sealing device according to the invention, the sealing force can be distributed to the sealing jaws in an advantageously symmetrical manner. In particular, separate actuation of the sealing jaws can be dispensed with. In particular, a synchronous movement of the sealing jaws is achievable advantageously automatically, in particular without additional electronic input. In particular, a risk of an asymmetrical force application can be kept advantageously low. In particular, a sealing process can be carried out in an advantageously reliable manner. In particular, a portion of the sealing force that does not contribute to the sealing process can be kept advantageously small.

The piston chamber is in particular connected to the drive element. The drive element is in particular configured for moving the piston chamber relative to the piston. Preferably, in particular in at least one operation state of the sealing device, the piston chamber and the piston are connected rigidly with at least respectively one of the force transmission elements. A rigid connection between two objects may be realized, for example, by screwing, by riveting, by latching, by clamping, by substance-to-substance bond or by a one-part implementation. For example, the piston is operatively connected with the force transmission element and the piston chamber is operatively connected with the further force transmission element. Alternatively, the piston is connected with the further force transmission element and the piston chamber is connected with the force transmission element. In an advantageously simple implementation, the force transmission element and/or the further force transmission element are/is fastened to the piston unit directly. Alternatively, the sealing device comprises at least one adjusting unit, by means of which a relative position between the piston chamber and/or the piston and force transmission element and/or the further force transmission element can be changed. The adjusting unit comprises, for example, an actuator, a further piston in a further piston chamber, a thread rod, a telescope rod, a clamping sleeve, or the like for an adjustment of a relative position between the piston chamber and/or the piston and the force transmission element and/or the further force transmission element. Preferably, the adjusting unit connects the piston unit with the force transmission elements at least during the sealing.

For example, in particular in at least one operation state of the sealing device, the piston is connected rigidly with the force transmission element. The force transmission element is preferably connected rigidly with the sealing holder. In particular, the force transmission element transmits a movement of the piston relative to the piston chamber to the sealing holder. When a force is applied by the drive element, the sealing holder and the piston move, in particular at least substantially, by the same distance in the same direction, in particular by the same distance except for a clearance fit with which the piston, the force transmission element, the optional adjusting unit and/or the sealing holder are fastened to one another. For example, in particular in at least one operation state of the sealing device, the piston chamber is connected rigidly with the further force transmission element. The further force transmission element is preferably connected rigidly with the further sealing holder. In particular, the force transmission element transmits a movement of the piston chamber relative to the piston to the further sealing holder. When a force is applied by the drive element, the further sealing holder and the piston chamber move, in particular at least substantially, by the same distance in the same direction, in particular by the same distance except for a clearance fit with which the piston chamber, the further force transmission element, the optional adjusting unit and/or the further sealing holder are fastened to one another.

By the implementation of the sealing device according to the invention, it is advantageously easy to convert the sealing force into two opposed forces which are both utilizable.

It is further proposed that the sealing device comprises at least one further piston unit with a further piston, the further piston being arranged in series with the piston along a mechanical chain of effect. In particular, the further piston unit comprises at least one further piston chamber, in which the further piston is arranged. The further piston and the further piston unit are preferably connected with a further drive element of the longitudinal sealing apparatus, which is in particular realized separately from the drive element. The further drive element may in particular be a hydraulic, pneumatic or electrical drive element. In particular, the piston unit can be actuated independently from the further piston unit. Preferably, a stroke direction of the piston unit and a stroke direction of the further piston unit are at least substantially parallel to each other, and in particular parallel to the displacement direction and/or to the further displacement direction. The piston unit is in particular configured for applying the sealing force to the sealing holders. The further piston unit is in particular configured for a movement of the sealing holders, in particular for moving the sealing holders back and forth between a rest position and a sealing position. In particular, a maximal stroke of the further piston unit is greater than a maximal stroke of the piston unit, in particular greater by more than 50%, preferentially greater by more than 100%. In particular, the sealing holders are arranged farther away from each other in the rest position than in the sealing position. For example, the piston chamber and the further piston chamber are connected rigidly with each other. For example, the piston is connected rigidly with the further piston chamber. For example, the further piston is connected rigidly with the piston chamber. For example, the piston and the further piston are connected rigidly with each other. Especially preferentially, the piston unit and the further piston unit have a common assembly plate, via which they are connected to each other. The assembly plate is in particular arranged so as to be movable relative to the machine frame, in particular spaced apart from the machine frame. Preferably the further piston unit is arranged along the mechanical chain of effect between the piston unit and the further force transmission element, alternatively between the piston unit and the force transmission element. In particular, the sealing force is transmitted through the further piston unit to one of the sealing holders. Preferably, during the sealing a position of the further piston in the further piston chamber is fixed. The implementation of the sealing device according to the invention advantageously allows differentiating between a movement of the sealing holders and an application of the sealing force to the sealing holders. In particular, a maximal stroke of the piston unit can be kept advantageously small. It is in particular advantageously possible to provide the sealing force quickly by the piston unit. In particular, advantageously high throughput of the sealing device is achievable. It is furthermore advantageously possible to store the sealing jaws in the rest position. In particular, a thermal load, in particular damaging, of the packaging material outside the sealing process can be kept advantageously small.

Furthermore, it is proposed that the coupling unit comprises at least one additional piston unit with an additional piston, which is arranged parallel to the piston and/or to the further piston, wherein the additional piston unit, the piston unit and/or the further piston unit are arranged on an, in particular the aforementioned, common assembly plate of the piston units. The additional piston is in particular arranged in an additional piston chamber. The additional piston unit is preferably at least substantially construction-wise identical, in particular except for a mirror symmetry, to the piston unit and/or the further piston unit. A stroke direction of the additional piston unit is preferably at least substantially parallel to the stroke direction of the piston unit or the further piston unit, in particular parallel to the displacement direction and/or the further displacement direction. The additional piston unit may be connected to an additional, in particular pneumatic, hydraulic or electrical, drive element or to the drive element or to the further drive element. The additional piston unit is in particular configured for a synchronous movement with the piston unit or the further piston unit. In particular, the additional piston unit is configured for transmitting the sealing force to the sealing holders and/or for moving the sealing holders back and forth between the rest position and the sealing position. The implementation of the sealing device according to the invention allows keeping a required piston displacement of the piston unit or the further piston unit advantageously small. It is furthermore possible to keep the sealing device advantageously compact, in particular while maintaining a symmetrical force distribution.

It is also proposed that the sealing device comprises a bearing unit for a floating support of the coupling unit, said bearing unit being configured to receive at least substantially the entire weight force of the coupling unit and of the sealing holders during operation of the coupling unit. The bearing unit preferably comprises at least one bearing element, in which the force transmission element or the further force transmission element is supported. The bearing element encompasses the force transmission element or the further force transmission element, in particular in a plane perpendicular to the displacement direction or the further displacement direction. The bearing element in particular supports the force transmission element or the further force transmission element in such a way that the force transmission element or the further force transmission element can realize a rectilinear movement through the bearing unit, in particular without moving by this the bearing element relative to the machine frame. The bearing element is in particular embodied as a slide bushing, as a ball bearing, as a roller bearing, or the like. In particular, the bearing unit conveys the weight force of the coupling unit, of the sealing holders and in particular of the sealing jaws into the machine frame. "At least substantially the entire weight force" is in particular to mean at least 50%, preferentially more than 75%, especially preferentially more than 90% of the entire weight force. Alternatively or additionally, the machine frame comprises a guide rail or a suspension or the like, which receives a portion of the weight force of the coupling unit, the sealing holders and in particular the sealing jaws, in particular without connecting a component of the coupling unit or the sealing holders rigidly to the machine frame. The implementation of the sealing device according to the invention advantageously enables symmetrical distribution of the sealing force to the sealing holders.

Beyond this it is proposed that the further force transmission element is arranged such that it projects through a material recess of the sealing holder. In particular, the sealing holder is arranged, in a plane parallel to the transport direction and to the further displacement direction which intersects with the sealing holders and the piston unit, between the further sealing holder and the piston unit. An aperture width of the material recess of the sealing holder in a plane perpendicular to the further displacement direction is preferably of sufficiently large for avoiding, in a movement of the further force transmission element along the further displacement direction, a physical contact of said material recess with the further force transmission element. Preferably the bearing unit comprises at least one sealing holder bearing element, which is arranged in the material recess of the sealing holder and accommodates the further force transmission element. The sealing holder bearing element encompasses the further force transmission element, in particular in a plane perpendicular to the further displacement direction. The sealing holder bearing element in particular supports the further force transmission element in such a way that the further force transmission element can carry out a rectilinear movement through the sealing holder, in particular such that the sealing holder can carry out a rectilinear movement along the further force transmission element, in particular in a direction opposed to the further force transmission element. The sealing holder bearing element is in particular embodied as a slide bushing, as a ball bearing, as a roller bearing, or the like. The implementation of the sealing device according to the invention enables advantageously stable implementation of the coupling unit. It is in particular possible to stabilize a relative orientation of the sealing holder and the further force transmission element relative to the machine frame using advantageously few structural elements. In particular, a tilt degree of the sealing holder or of the further force transmission element can be kept advantageously small.

It is moreover proposed that the sealing device comprises at least one packaging transport unit, in particular the aforementioned packaging transport unit, for a conveying of a packaging material, in particular the aforementioned packaging material, through the longitudinal sealing apparatus, wherein the further force transmission element is arranged such that it projects through a material recess of the packaging transport unit. The packaging transport unit in particular comprises a contact conveying element for a friction-fit and/or force-fit with the packaging material. The contact conveying element is in particular realized as a closed belt. The packaging transport unit in particular comprises at least one guide element, in particular several guide elements, which the contact conveying element is arranged on. In particular, the contact conveying element engages around the at least one guide element, in particular the guide elements, in a plane perpendicular to the displacement direction. The guide elements may be connected rigidly with the machine frame or may be supported on the machine frame such that they are rotatable relative to the machine frame. For example, the contact conveying element is realized as a smooth belt or as a toothed belt. For example, the at least one guide element is realized as a guide roller, in particular deflection roller, or as a pin. In a plane perpendicular to the displacement direction, the contact conveying element in particular engages around an inner surface. In particular, the at least one guide element is arranged within the inner surface. Optionally the packaging transport unit comprises at least one structure element, in particular a transport unit assembly plate, which together with the at least one guide element fills the inner surface at least substantially, in particular at least by 25%, preferably by more than 50% with respect to a total surface area of the inner surface.

The further force transmission element is preferably arranged such that it projects through the inner surface. In particular, the contact conveying element surrounds the further force transmission element completely in the plane perpendicular to the further displacement direction, wherein the contact conveying element is arranged spaced apart from the further force transmission element. Preferentially the material recess of the packaging transport unit, which the further force transmission element projects through, is arranged within one of the conveying elements. In a plane perpendicular to the further displacement direction, an aperture width of the material recess of the packaging transport unit is sufficiently large for avoiding, in a movement of the further force transmission element along the further displacement direction, a physical contact of this material recess with the further force transmission element. Especially preferentially, the bearing element is arranged in the material recess of the packaging transport unit. In particular, the bearing unit comprises at least one transport bearing element, by means of which the at least one guide element is, in particular rotatably, supported. The transport bearing element is in particular embodied as a rotary shaft and is arranged in the material recess of the packaging transport unit. The transport bearing element for supporting the at least one guide element and the bearing element for supporting the further force transmission element may be realized in a one-part implementation or may be connected to each other by substance-to-substance bond or may be realized separately from each other. Preferably the bearing element is arranged within the transport bearing element. In particular, the bearing element, the transport bearing element and the further force transmission element are arranged concentrically with one another. Alternatively, the material recess of the packaging transport unit is arranged within the structure element. The implementation of the sealing device according to the invention enables arranging the packaging transport unit and the sealing holders with the sealing jaws in an advantageously small construction space.

Furthermore, it is proposed that the sealing device comprises at least one, in particular immobile, counter sealing holder unit, which forms a press-on surface for a pressing-on of one of the sealing jaws, wherein the further force transmission element is arranged such that it projects through a material recess of the counter sealing holder unit. Preferably, the counter sealing holder unit comprises a counter sealing holder for fixing the counter sealing holder unit relative to the machine frame, and comprises a counter sealing element which forms the press-on surface. The counter sealing element is preferably arranged on the counter sealing holder, in particular connected rigidly with the counter sealing holder or realized in a one-part implementation with the counter sealing holder. The press-on surface is arranged along the displacement direction opposite the sealing holder. In particular, the sealing holder presses the sealing jaw against the press-on surface during the sealing, the packaging material being arranged between the sealing jaw and the press-on surface. The counter sealing holder unit is—at least during the sealing—immobile relative to the machine frame, at least up to a designated, maximally adjustable sealing force of the sealing device. The material recess is in particular arranged in the counter sealing holder. In a plane perpendicular to the further displacement direction, an aperture width of the material recess of the counter sealing holder is preferably sufficiently large for avoiding a physical contact of this material recess with the further force transmission element during a movement of the further force transmission element along the further displacement direction. Preferably the bearing unit comprises at least one counter sealing holder bearing element, which is arranged in the material recess of the counter sealing holder and accommodates the further force transmission element. The counter sealing holder bearing element engages around the further force transmission element, in particular in a plane perpendicular to the further displacement direction. The counter sealing holder bearing element supports the further force transmission element in particular in such a way that the further force transmission element can carry out a rectilinear movement through the counter sealing holder, in particular without moving by this the counter sealing holder relative to the machine frame. The counter sealing holder bearing element is in particular embodied as a slide bushing, as a ball bearing, as a roller bearing, or the like. The counter sealing holder bearing element is preferably realized in a one-part implementation with the transport bearing element. Preferably the counter sealing holder unit is fixed, in particular clamped, to the bearing unit such that it is non-destructively detachable. In particular, in a rest state of the longitudinal sealing apparatus the counter sealing holder unit is displaceable along the bearing unit in order to realize a format change of the container that is to be produced. Preferably the sealing device comprises an analogously implemented further counter sealing holder unit, which forms a further press-on surface that is arranged along the displacement direction opposite the further sealing holder. In particular, in a plane parallel to the transport direction and to the further displacement direction, the packaging transport unit is arranged between the counter sealing holder unit and the further counter sealing holder unit. The counter sealing element of the counter sealing holder unit and a counter sealing element of the further counter sealing holder unit may be realized separately from each other or in a one-part implementation. In particular, the counter sealing element of the counter sealing holder unit and the counter sealing element of the further counter sealing holder unit can be displaced—independently from each other or only together—in a direction perpendicular to the transport direction, in particular for adapting a format of a container that is to be produced. The implementation according to the invention allows producing an advantageously compact sealing device.

It is further proposed that the coupling unit comprises at least one adjusting element, by means of which an initial position of the sealing holder and/or of the further sealing holder relative to the force transmission element and/or the further force transmission element is adjustable without a tool. The adjusting element is in particular part of the aforementioned adjusting unit. The coupling unit in particular comprises a deflecting unit, which connects the piston unit mechanically, in particular indirectly via the further piston unit, with the further force transmission element. The deflecting unit is preferably connected rigidly with one of the piston units. The deflecting unit is preferably arranged at the further force transmission element in a non-destructively detachable manner. In particular, the deflecting unit comprises two opposite-situated projections which together engage around the further force transmission element. The adjusting element is in particular realized as a thread rod configured for clamping-in or detaching the further force transmission element by means of the projections. Alternatively, the force transmission element has a perforated grid through which an adjusting element, realized as a pin or as a screw, can be fixed at the deflecting unit. The implementation of the sealing device according to the invention allows advantageously simple adaption of the sealing device to different formats of containers that are to be produced.

Beyond this a longitudinal sealing apparatus with at least one sealing device according to the invention and with at least one further sealing device according to the invention is proposed. The further sealing device is preferably realized at least substantially construction-wise identical to the sealing device. In particular, the further sealing device comprises a coupling unit, a sealing holder, a further sealing holder and/or a packaging transport unit in analogy to those described for the sealing device. The longitudinal sealing apparatus preferably has the machine frame as the only machine frame, on which the sealing device and the further sealing device are supported, in particular supported floatingly. Alternatively, the sealing device and the further sealing device each have their own machine frame. The components of the sealing device and of the further sealing device are preferably arranged in mirror symmetry, in particular with respect to a mirror plane parallel to the displacement direction and to the transport direction. The sealing device and the further sealing device are in particular arranged spaced apart from each other or are connected to each other only via the shared machine frame and/or via shared hydraulic, electrical or pneumatic feed lines. The implementation according to the invention allows providing an advantageously compact longitudinal sealing apparatus which creates synchronous longitudinal seams on a packaging material with advantageously small input, in particular input in terms of controlling.

The sealing device according to the invention and/or the longitudinal sealing apparatus according to the invention shall herein not be limited to the application and implementation described above. In particular, in order to fulfil a functionality that is described here, the sealing device according to the invention and/or the longitudinal sealing apparatus according to the invention may comprise a number of individual elements, components and units that differs from a number given here. Moreover, with regard to the value ranges given in this disclosure, values situated within the limits mentioned shall also be considered to be disclosed and to be usable according to requirements.

BRIEF DESCRIPTION OF THE DRAWINGS

Further advantages will become apparent from the following description of the drawings. In the drawings an exemplary embodiment of the invention is illustrated. The drawings, the description and the claims contain a plurality of features in combination. Someone skilled in the art will purposefully also consider the features separately and will find further expedient combinations.

It is shown in.

DETAILED DESCRIPTION

Figure 1:
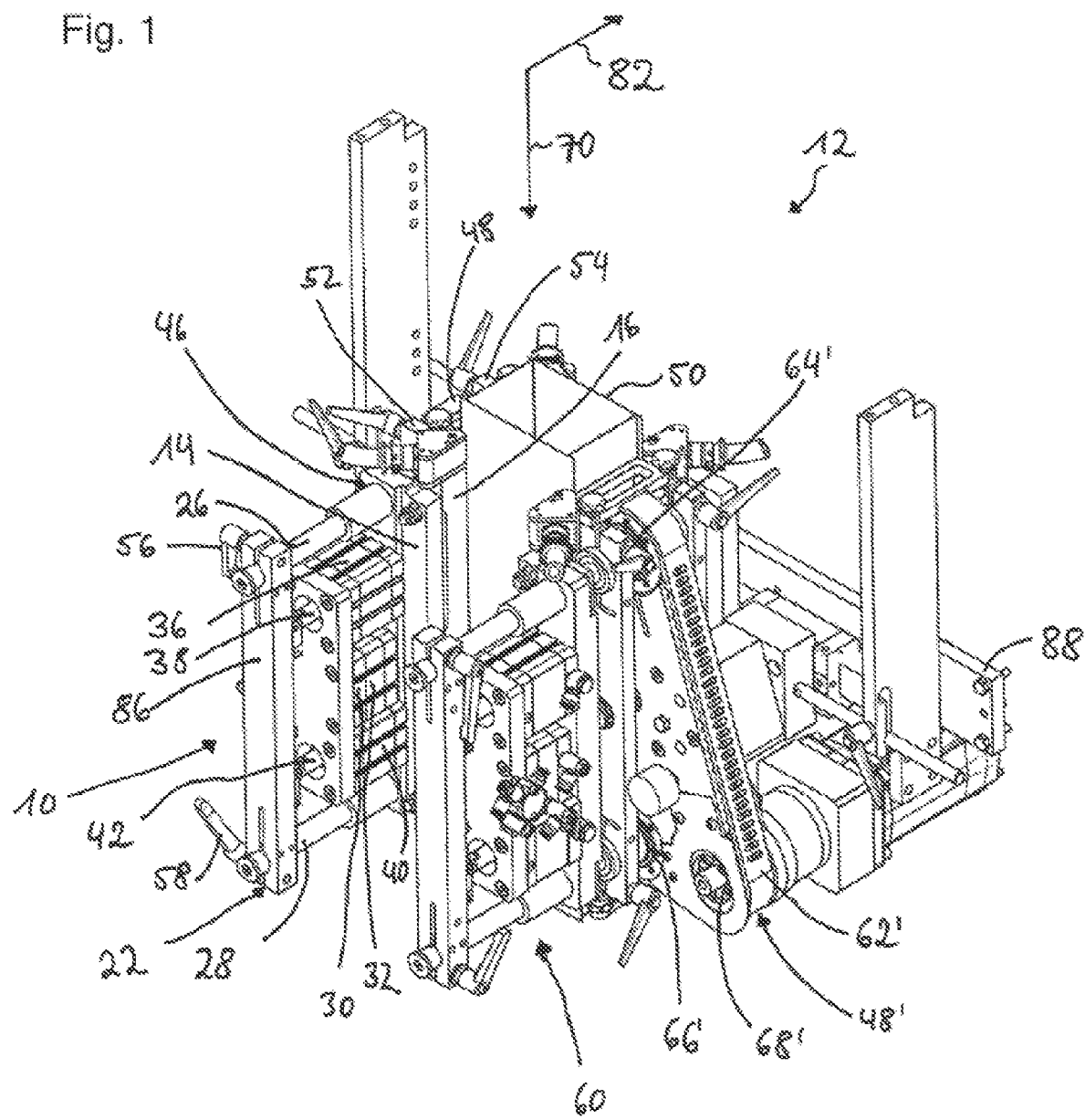
FIG. 1 a schematic perspective view of a longitudinal sealing apparatus according to the invention, with a sealing device according to the invention and a further sealing device according to the invention, FIG. 2 a schematic illustration of the longitudinal sealing apparatus according to the invention, in a view counter to a transport direction of the longitudinal sealing apparatus according to the invention, and FIG. 3 a schematic sectional view of the longitudinal sealing apparatus according to the invention in a section plane parallel to the transport direction.

FIG. 1 shows a perspective view of a longitudinal sealing apparatus 12 for a packaging machine. The longitudinal sealing apparatus 12 comprises at least one sealing device 10. The longitudinal sealing apparatus 12 comprises at least one further sealing device 60. The sealing device 10 and the further sealing device 60 are preferably built in mirror-symmetrical fashion. The sealing device 10 and the further sealing device 60 in particular comprise the same components. For a better overview, the components of the further sealing device 60 are only in some cases given reference numerals, the reference numerals of the further sealing device 60 having the same ciphers as the reference numerals of the sealing device 10, wherein the reference numerals are marked with an apostrophe for differentiation. The sealing device 10 is configured for a sealing of a packaging material 50. The sealing device 10 comprises at least one packaging transport unit 48. The packaging transport unit 48 is configured for conveying the packaging material 50 along a transport direction 70 between sealing jaws 16, 20, in particular between the sealing device 10 and the further sealing device 60. During operation of the longitudinal sealing apparatus 12, the transport direction 70 is preferably aligned with the vertical and in particular points from the top downwards.

The packaging transport unit 48 is in particular realized mirror-symmetrically to a packaging transport unit 48' of the further sealing device 60, which is for perspective reasons visible in FIG. 1. The packaging transport unit 48 comprises at least one contact conveying element 62 for a friction-fit and/or force-fit with the packaging material 50 (cf. contact conveying element 62' of the further sealing device 60). The packaging transport unit 48 comprises at least one guide element 64 (cf. guide element 64' of the further sealing device 60). The packaging transport unit 48 comprises at least one further guide element 66 (cf. further guide element 66' of the further sealing device 60). The guide elements 64, 66 are configured for guiding the contact conveying element 62 along the transport direction 70. The packaging transport unit 48 comprises a gear element 68 for a force and/or torque transmission onto the contact conveying element 62 (cf. gear element 68' of the further sealing device 60). The gear element 68 is arranged spaced apart from the guide element 64 and the further guide element 66 in a direction perpendicular to the transport direction 70.

Figure 2:
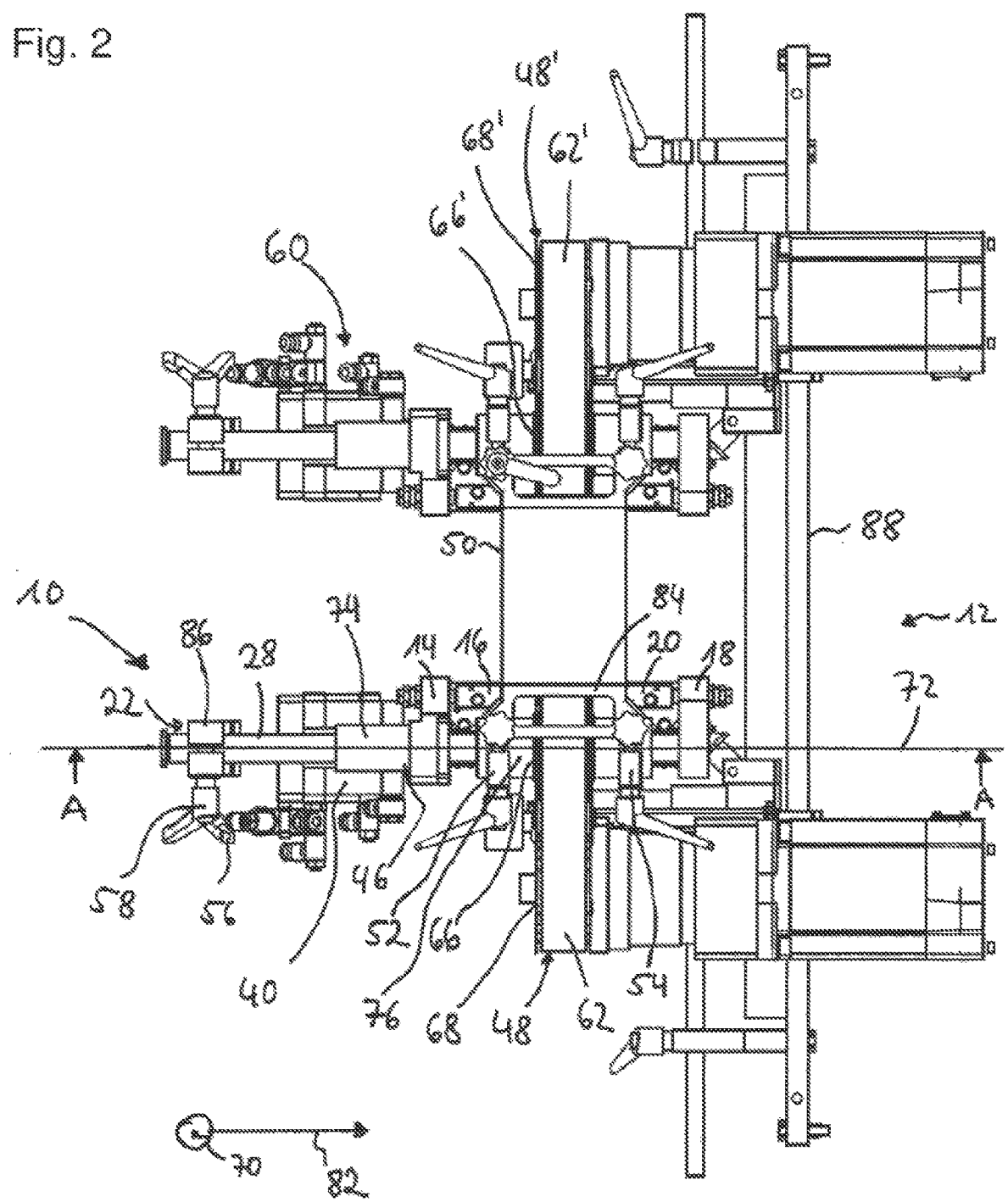

FIG. 2 shows a view of the longitudinal sealing apparatus 12 counter to the transport direction 70, in particular an underside of the longitudinal sealing apparatus 12. The sealing device 10 comprises the sealing jaw 16. The sealing device 10 comprises the further sealing jaw 20. The sealing device 10 comprises at least one sealing holder 14 for fixing the sealing jaw 16. The sealing device 10 comprises at least one further sealing holder 18 for fixing the further sealing jaw 20. The sealing holder 14 and the further sealing holder 18 are supported so as to be movable relative to each other. The sealing device 10 comprises a mechanical coupling unit 22. The sealing holder 14 and the further sealing holder 18 are arranged at the coupling unit 22. The coupling unit 22 comprises at least one force transmission element 24 (cf. FIG. 3). The coupling unit 22 comprises at least one further force transmission element 26, 28, in particular two further force transmission elements 26, 28, wherein one of these will in the following be referred to as the additional force transmission element 28 insofar as a differentiation becomes necessary (cf. FIGS. 1 and 3). The force transmission element 24 is configured for a transmission of a provided sealing force, in the form of a pressure force, to the sealing holder 14 during a sealing operation. The further force transmission elements 26, 28 are configured for a transmission of the provided sealing force, in the form of a traction force, to the further sealing holder 18 during the sealing. The sealing device 10 comprises at least one, in particular immobile, counter sealing holder unit 52. The sealing device 10 comprises at least one, in particular immobile, further counter sealing holder unit 54. The counter sealing holder unit 52 forms a press-on surface for a pressing-on of the sealing jaw 16. The further counter sealing holder unit 54 forms a press-on surface for a pressing-on of the further sealing jaw 20. The counter sealing holder units 52, 54 in particular comprise a shared counter sealing holder element 84, which forms the press-on surfaces of the two counter sealing holder units 52, 54. The counter sealing holder unit 52 in particular comprises a counter sealing holder and the further counter sealing holder unit 54 preferably comprises a further counter sealing holder, on which the shared counter sealing holder element 84 is fastened, in particular screwed.

The contact conveying element 62 is arranged at least partly between the sealing holders 14, 18. In particular, the contact conveying element 62 is arranged between the counter sealing holder units 52, 54. In particular, the counter sealing holder units 52, 54 are arranged, together with the contact conveying element, 62, between the sealing holders 14, 18. The sealing jaw 16, the further sealing jaw 20 and the contact conveying element 62 are arranged at least substantially flush with respect to a plane that is perpendicular to the transport direction 70. The sealing holders 14, 18 are in particular supported in such a way that they are displaceable relative to each other along a displacement direction 82. Preferably the sealing holder 14, the counter sealing holder unit 52, the packaging transport unit 48, the further counter sealing holder unit 54 and/or the further sealing holder 18, are arranged, in particular in this sequence, at the further force transmission elements 26, 28. A rotary axis of the guide element 64 or of the further guide element 66 runs at least substantially parallel to the displacement direction 82 of the sealing holder 14 and/or of the further sealing holder 18.

Figure 3:
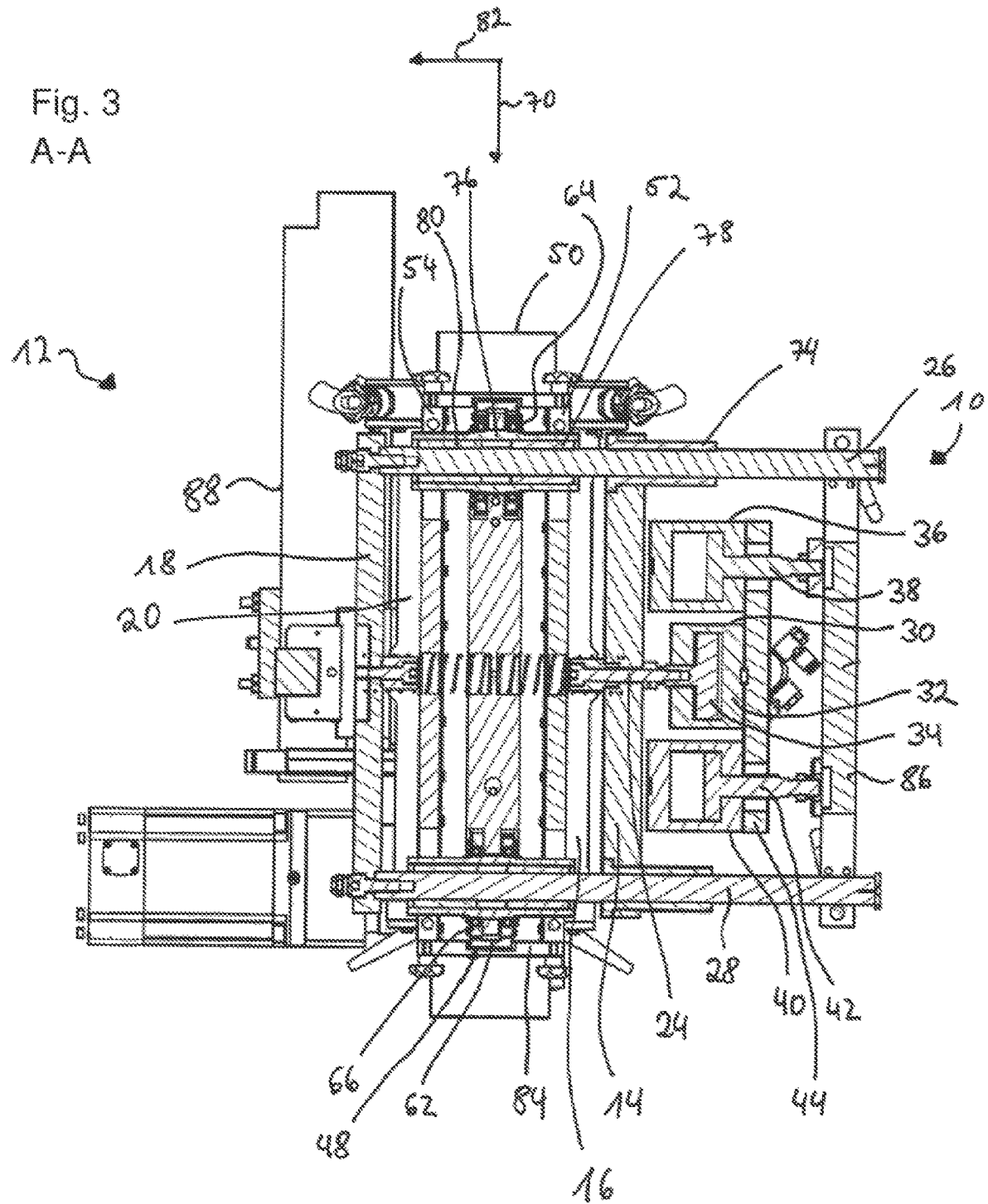

FIG. 3 shows a sectional view of the longitudinal sealing apparatus 12 in a sealing plane 72. The sealing plane 72 in particular extends perpendicularly to the transport direction 70. The coupling unit 22 comprises at least one, in particular pneumatic, piston unit 30 with at least one piston chamber 32 and with a piston 34 supported in the piston chamber 32. The piston 34 is operatively connected with the force transmission element 24. The piston chamber 32 is operatively connected with the further force transmission elements 26, 28. The coupling unit 22 comprises at least one further piston unit 36 with a further piston 38. The further piston 38 is arranged in series with the piston 34 along a mechanical chain of effect. The coupling unit 22 comprises at least one additional piston unit 40 with an additional piston 42. The additional piston 42 is arranged parallel to the further piston 38. The additional piston unit 40, the piston unit 30 and/or the further piston unit 36 are arranged on a common assembly plate 44 of the piston units 30, 36, 40. The sealing device 10 in particular comprises a structural unit as a deflecting unit 86. The deflecting unit 86 is in particular operatively connected with the further piston 38 and/or the additional piston 42. In particular, the deflecting unit 86 is fixed, in particular clamped, to the further force transmission elements 26, 28. The coupling unit 22 comprises at least one adjusting element 56, 58, by means of which an initial position of the sealing holder 14 and/or of the further sealing holder 18 relative to the force transmission element 24 and/or the further force transmission elements 26, 28 and/or relative to the contact conveying element 62 is adjustable without a tool.

The sealing device 10 comprises a bearing unit 46 for a floating support of the coupling unit 22. The bearing unit 46 is configured, during operation of the coupling unit 22, to receive at least substantially the entire weight force of the coupling unit 22 and of the sealing holder 14, 18. The further force transmission element 26, 28 is arranged such that it projects through a material recess of the sealing holder 14. In particular, the bearing unit 46 comprises a sealing holder bearing element 74. The sealing holder bearing element 74 is, for example, realized as a slide bearing. The sealing holder bearing element 74 is in particular arranged in the material recess of the sealing holder 14. The further force transmission element 26 is in particular supported in the sealing holder bearing element 74. The further force transmission element 26, 28 is arranged such that it projects through a material recess of the packaging transport unit 48. In particular, the bearing unit 46 comprises a transport bearing element 76. The transport bearing element 76 is realized, for example, as a slide bearing. The transport bearing element 76 is in particular arranged in the material recess of the packaging transport unit 48. The further force transmission element 26 is in particular arranged in the transport bearing element 76. The further force transmission element 26, 28 is arranged such that it projects through a material recess of the counter sealing holder unit 52, 54. In particular, the bearing unit 46 comprises a counter sealing holder bearing element 78. The counter sealing holder bearing element 78 is realized, for example, as a slide bearing. The counter sealing holder bearing element 78 is in particular arranged in the material recess of the counter sealing holder unit 52. The further force transmission element 26 is in particular arranged in the counter sealing holder bearing element 78. In particular, the bearing unit 46 comprises a further counter sealing holder bearing element 80. The further counter sealing holder bearing element 80 is realized, for example, as a slide bearing. The counter sealing holder bearing element 80 is in particular arranged in the material recess of the further counter sealing holder unit 54. The further force transmission element 26 is in particular supported in the further counter sealing holder bearing element 80. The counter sealing holder bearing element 78 and/or the further counter sealing holder bearing element 80 are/is in particular arranged within the transport bearing element 76. The counter sealing holder unit 52 and/or the further counter sealing holder unit 54 of the sealing device 10 are/is arranged in particular fixed, at the bearing unit 46, in particular at the transport bearing element 76. The guide element 64 and/or the further guide element 66 of the packaging transport unit 48 for guiding the contact conveying element 62 are arranged at the bearing unit 46. The guide element 64 is in particular supported at the transport bearing element 76.

The sealing jaw 16 is in particular fastened to the sealing holder 14. The sealing holder 14 is preferably fastened to the force transmission element 24. The sealing holder 14 is in particular supported movably at the further force transmission elements 26, 28, in particular for carrying out a rectilinear movement. The force transmission element 24 is in particular fastened to the piston 34. The piston 34 is preferably supported in the piston chamber 32. The piston chamber 32 is preferably fastened to the common assembly plate 44. A further piston chamber of the further piston unit 36 and/or an additional piston chamber of the additional piston unit 40 are/is in particular fastened on the common assembly plate 44. The further piston 38 is in particular supported in the further piston chamber. The additional piston 42 is in particular supported in the additional piston chamber. The further piston 38 and/or the additional piston are/is in particular fastened to the deflecting unit 86. The further force transmission elements 26, 28 are preferably fastened to the deflecting unit 86. The further force transmission elements 26, 28 are in particular supported within the transport bearing element 76. In particular, the transport bearing element 76 is arranged, in particular fixed, directly or indirectly on a machine frame 88 of the longitudinal sealing apparatus 12. Preferably the further sealing holder 18 is fastened to the further force transmission elements 26, 28. The further sealing jaw 20 is in particular fastened to the further sealing holder 18. If there is a pressure change in at least one of the piston units 30, 36, 40, the sealing holders 14, 18 move, with the force transmission elements 24, 26, 28 as intermediaries, and in particular via the deflecting unit 86, in opposed directions perpendicular to the transport direction 70.

A maximal longitudinal extent of the contact conveying element 62 parallel to the transport direction 70 and a maximal longitudinal extent of the sealing holder 14 and/or of the further sealing holder 18 parallel to the transport direction 70 are realized so as to have at least substantially the same length. A longitudinal axis of a mounting rod of the sealing device 10, which the sealing holder 14 and/or the further sealing holder 18 are/is arranged on, and a rotary axis of the guide element 64 or of the further guide element 66 are arranged at least substantially coaxially. The mounting rod is in particular realized by the further force transmission element 26.

The invention claimed is:

1. A sealing device for a longitudinal sealing apparatus of a packaging machine, the sealing device having a sealing holder (14) for fixing a sealing jaw (16) of the longitudinal sealing apparatus, the sealing device further including a further sealing holder (18) for fixing a further sealing jaw (20) of the longitudinal sealing apparatus, the sealing holder (14) and the further sealing holder (18) being supported movably relative to each other, and the sealing device further including a mechanical coupling unit (22) which the sealing holder (14) and the further sealing holder (18) are arranged on, wherein the mechanical coupling unit (22) comprises a force transmission element (24) and a further force transmission element (26, 28), the force transmission element (24) being configured, during a sealing, to transmit a provided sealing force to the sealing holder (14) in the form of a pressure force, and the further force transmission element (26, 28) being configured, during a sealing, to transmit the provided sealing force to the further sealing holder (18) in the form of a traction force, wherein the mechanical coupling unit (22) comprises a piston unit (30) with a piston chamber (32) and with a piston (34) supported in the piston chamber (32), wherein the piston (34) is operatively connected with the force transmission element (24) and the piston chamber (32) is operatively connected with the further force transmission element (26, 28).

2. The sealing device according to claim 1, wherein the mechanical coupling unit (22) comprises a further piston unit (36) with a further piston (38), the further piston (38) being arranged in series with the piston (34) along a mechanical chain of effect.

3. The sealing device according to claim 2, wherein the mechanical coupling unit (22) comprises an additional piston unit (40) with an additional piston (42) which is arranged parallel to the piston (34) and/or to the further piston (38), wherein the additional piston unit (40), the piston unit (30) and/or the further piston unit (36) are arranged on a common assembly plate (44) of the piston units (30, 36, 40).

4. The sealing device according to claim 1, wherein a bearing unit (46) for a floating support of the mechanical coupling unit (22), the bearing unit (46) being configured to receive at least substantially an entire weight force of the mechanical coupling unit (22) and of the sealing holders (14, 16) during operation of the mechanical coupling unit (22).

5. The sealing device according to claim 1, wherein the further force transmission element (26, 28) projects through a material recess of the sealing holder (14).

6. The sealing device according to claim 1, further comprising a packaging transport unit (48) for conveying a packaging material (50) through the longitudinal sealing apparatus, wherein the further force transmission element (26, 28) projects through a material recess of the packaging transport unit (48).

7. The sealing device according to claim 1, further comprising a counter sealing holder unit (52, 54), which forms a press-on surface for a pressing-on of one of the sealing jaws (16, 20), wherein the further force transmission element (26, 28) projects through a material recess of the counter sealing holder unit (52, 54).

8. The sealing device according to claim 7, wherein the counter sealing holder unit (52, 54) is immobile.

9. The sealing device according to claim 1, wherein the mechanical coupling unit (22) comprises at least one adjusting element (56, 58), wherein an initial position of the sealing holder (14) and/or of the further sealing holder (18) relative to the force transmission element (24) and/or the further force transmission element (26, 28) is adjustable without a tool.

10. A longitudinal sealing apparatus with at least one sealing device according to claim 1.

11. The longitudinal sealing apparatus according to claim 10, comprising at least two sealing devices.

12. The sealing device according to claim 1, wherein the piston unit (30) is a pneumatic piston unit (30).

\* \* \* \* \*